United States Patent Office 3,616,715
Patented Nov. 2, 1971

3,616,715
MULTIPLE CUTTER LATHE
Grigor Arutjunovich Shaumyan, Ananievsky pereulok 5, kv. 63, Moscow, U.S.S.R.; Karen Armenakovich Ter-Akopyan, Ulitsa Paronyana 11, kv. 5; and Kolya Atanesovich Karapetyan, Pereulok Alabyana 17/14, kv. 16, both of Erevan, U.S.S.R.; Alexandr Ivanovich Lobanov, Ladozihzkaya ulitsa 2/9, kv. 103, Moscow, U.S.S.R.; Petr Mikhailiovich Chernyansky, Ulitsa Gorkogo 1, kv. 9, poselok Zavety Ilicha, Moskovskoi oblasti, U.S.S.R.; Akop Minasovich Epremyan, Ulitsa Erzinkyana 41, Erevan, U.S.S.R.; Sergei Andreevich Savkin, Studencheskaya ulitsa 35, kv. 18, Moscow, U.S.S.R.; Jury Mikhailovich Ermakov, Sovetskaya ulitsa 6, kv. 20, Balashikha Moskovskoi oblasti, U.S.S.R.; Viktor Sergeevich Kiselev, Sadova-Triumfalnaya ulitsa 21, kv. 17 Moscow, U.S.S.R.; and Alexei Yakovlevich Zagorodnikov, deceased, late of Ulitsa Osipenko 58/60, kv. 31, Moscow, U.S.S.R.; by Valentina Fedorovna Zagorodnikova, Alexandr Alexeevich Zagorodnikov, and Elena Alexeevna Zagorodnikova, administrators, all of Ulitsa Osipenko 58/60, kv. 31, Moscow, U.S.S.R.
Filed Oct. 17, 1968, Ser. No. 768,977
Int. Cl. B23b 3/00, 3/28
U.S. Cl. 82—2                                    3 Claims

ABSTRACT OF THE DISCLOSURE

A multiple cutter lathe comprises cutters carried by rests operatively connected to respective cam shafts for rotation therewith. The cutters are mounted in rows in angular displacement with one another and the cutters of one rest are displaced relative to the row of cutters of the other rests in relation to the centers of rotation of the rests and the drive spindle for a workpiece by an angle smaller than the angular displacement of adjacent cutters. The cutters of the rests thus alternately machine the workpiece in the lathe.

The present invention relates to the field of machine tool industry, and more particularly to multiple cutter lathes.

The invention can be most effectively used for turning intricate-shape workpieces, for example, inner races of ball and roller bearings etc.

Known in the prior art are multiple cutter machine-tools for turning workpieces, wherein each rest, carrying cutters is operatively connected to the cam shaft and is imparted reciprocating or rotary motion from said shaft via transmitting gears.

The rests with the cutters, operatively connected to the cam shafts together form a working member of the lathe. The presence of transmitting gears between the commanding member that is, the cam shaft, and the actuating member, that is, the rest with the cutters, considerably complicates the machine-tool design, reduces the accuracy of machining and the system rigidity, increases the number of failures in the control system and as a result, reduces the reliability of the working member.

The presence of additional transmission gears in the known working members increases the machine-tool overall dimensions, adversely affects its arrangement, considerably reduces the machining zone, which in the end adversely affects the cutting process.

The transfer of commands from the cam shaft to the rest with the cutter takes a certain amount of time, which in the end reduces the machine tool efficiency.

The location of the cutters on the rest also plays a certain part in the increase of the process efficiency. In the conventionally known working members the cutters are displaced, bringing about uneven loading of the workpiece spindle with regard to cutting forces. Maximum summary forces cause the greatest forcing away of the workpiece spindle and reduce both the accuracy of machining and feed value.

An object of the present invention is the elimination of the above-said disadvantages.

Another object of the present invention is the development of such a multiple cutter lathe, which would be simpler in design and construction and would ensure greater technical possibilities, that is, the possibility to locate considerably more cutters on the tool rests of the working member as compared to the known machine tools intended for turning; the possibility of successive bringing of cutters into contact with the workpiece being machined, which would ensure even distribution of cutting forces and would ensure the possibility of operation at higher rates.

Still another object is to provide high reliability of commanding and executive members of the machine tool, as well as especially high rigidity and vibration-resistance of the machine tool working member.

Yet another object of the present invention is the development of such a machine tool similar to the above-said, wherein the working member would fully ensure the workpiece machining, in other words, would set a mechanical program for obtaining a required profile of the workpiece, controlling the entire operating cycle of the machine tool, and simultaneously would not block the cutting zone, would ensure a more reliable and free chip removal as compared to the known designs of the working members for the machine tools of similar destination.

A still further object of the present invention is the development of a similar machine tool, wherein the time required for the idle stroke of the working member rests is reduced and coincides with the time of the workpiece loading and unloading.

And still another object of the present invention is to develop a machine tool, which would have a clearance-free gearing connection of the working member with the spindle, providing for the best cutting conditions, desirable change of cutting angles, high accuracy, finish and quality of the machined surfaces of the workpiece.

In accordance with the above-said and other objects in the machine tool according to the present invention, each rest of the working member is fixed on the respective cam shaft and rotates together therewith, the cutters being mounted on the rests with an angular displacement relative to each other in such a manner that the row of cutters on one rest is displaced relative to the row of cutters on the other rest in relation to the line of centers of the spindle and rest rotation through an angle, which is less than the angular displacement of adjacent cutters, so that the cutters of one rest be brought in contact with the workpiece being machined alternately with the cutters of the other rest.

The best solution is achieved by the fact that each rest of the working member is essentially a disc, carrying holders with cutters, fitted therein relative to the spindle axis with the displacement in the axial and radial directions thus forming together with the cutters of the other rests a mechanical program for machining the entire profile of the workpiece being machined.

It is expedient that each cam shaft be operatively connected to the spindle through a clearance-free gearing. The cam shaft with the rest and the spindle with the workpiece should rotate in opposite directions.

This design solution of the machine tool according to the present invention ensures its high rigidity, vibration-stability and high accuracy of the workpiece being machined, simplicity and reliability of the rest drive, the location of a great number of cutters on one rest without blocking the machining zone, which ensures convenient workpiece loading and unloading, and free chip removal.

As a result, the overall dimensions of the machine tool and consequently the shop area required for it is reduced 1.5–2 times. The efficiency of machining increases 2–3 times, the accuracy being 1.5 times higher than that of the workpieces machined in the conventionally known machine tools.

The present invention is further described by way of example with reference to the accompanying drawings, wherein.

Figure 1:
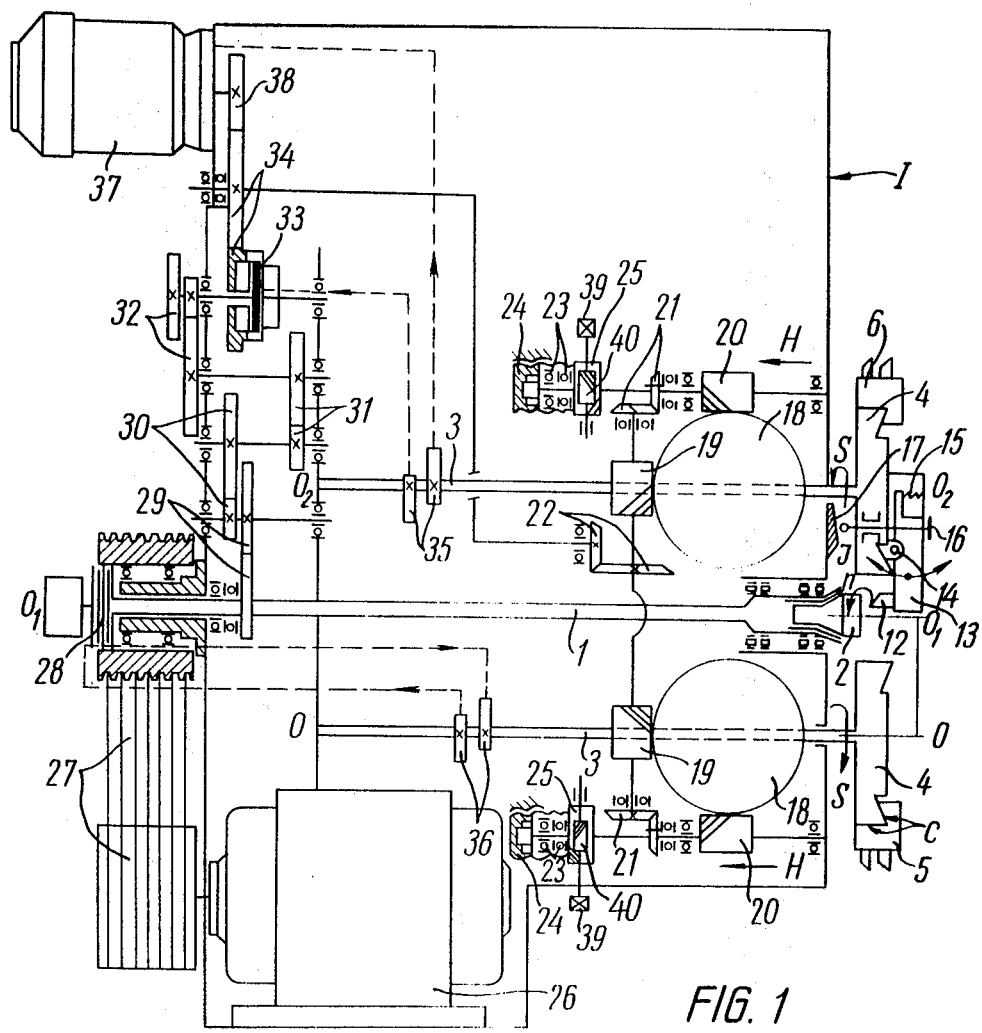
FIG. 1 shows a gearing diagram of the lathe according to the present invention, with two rests operatively connected to the spindle.

The machine tool according to the present invention comprises a spindle 1 (FIG. 1), a workpiece 2 being fastened to the spindle 1 by any conventional method. Two cam shafts 3 are mounted within a casing I, which also accommodates the spindle. Rigidly fixed on each shaft 3 is a respective rest 4 with cutters. The rests 4 with the cutters form a working member of the machine tool. The fact that the spindle 1 and shafts 3 are mounted within one and the same casing 1 ensures high accuracy of the distance between the centers (line $0–0_1–0_2$ of the spindle and rest centers of rotation) and a high total rigidity of the spindle-rest system.

Each rest 4 is fashioned as a disc, whose cylindrical and face surfaces C are used as bases for mounting multiple cutter holders 5 and 6 thereon.

Another shape of the rest may be also employed, for example a polyhedron, however, the cylindrical shape is easier to produce.

Figure 2:
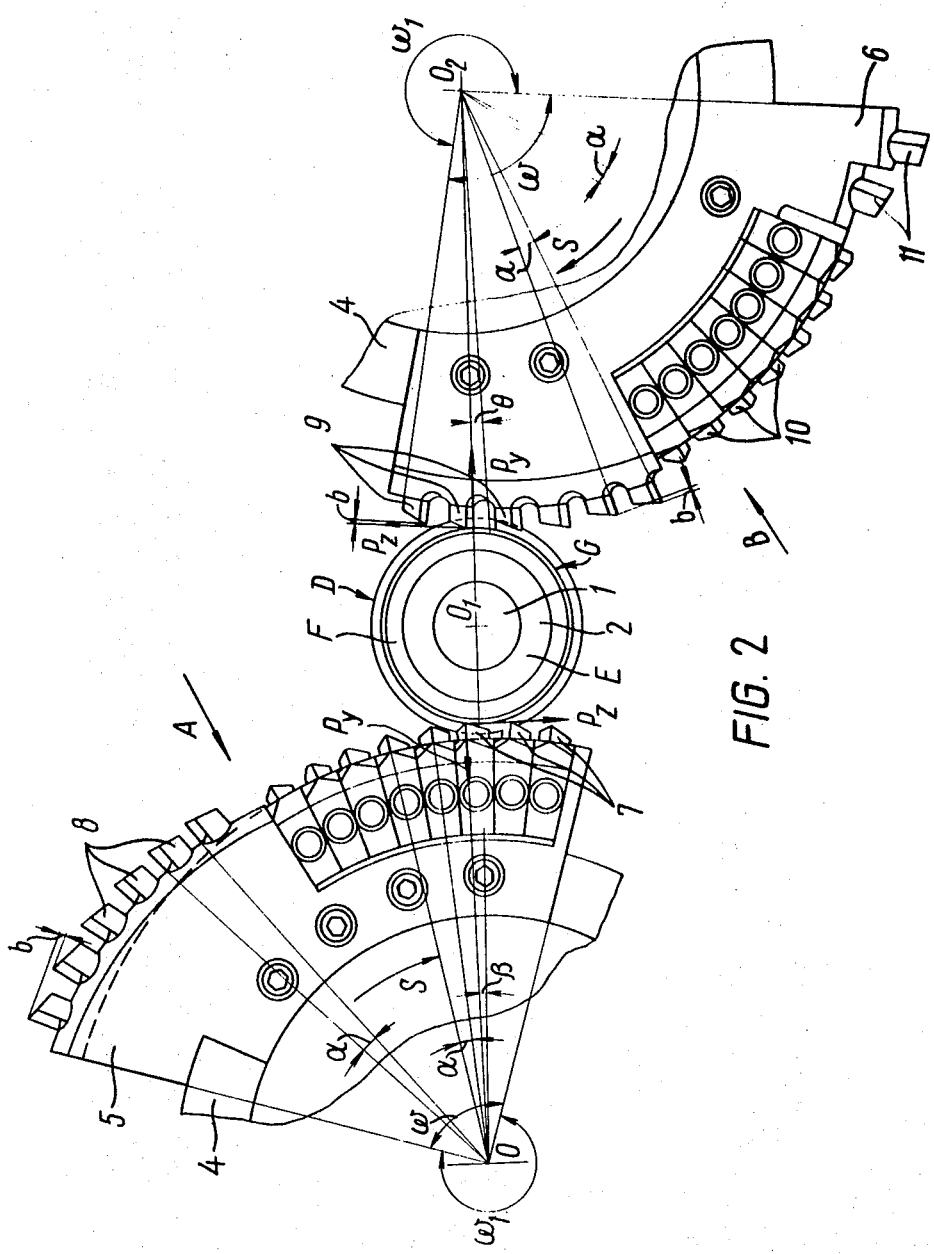
FIG. 2 is a front view of the spindle, showing mutual position of the workpiece and rests with cutters.

The multiple cutter holders 5 and 6 are fastened to the rests 5 by a conventional method (FIG. 2). The holders 5 and 6 are essentially cylindrical sectors, in which groups of cutters are located with an angular displacement, equal to $\alpha$, the angle $\alpha$ being formed by two adjacent cutters and required for successive penetration of the cutters into the workpiece and for free chip removal.

Figure 3:
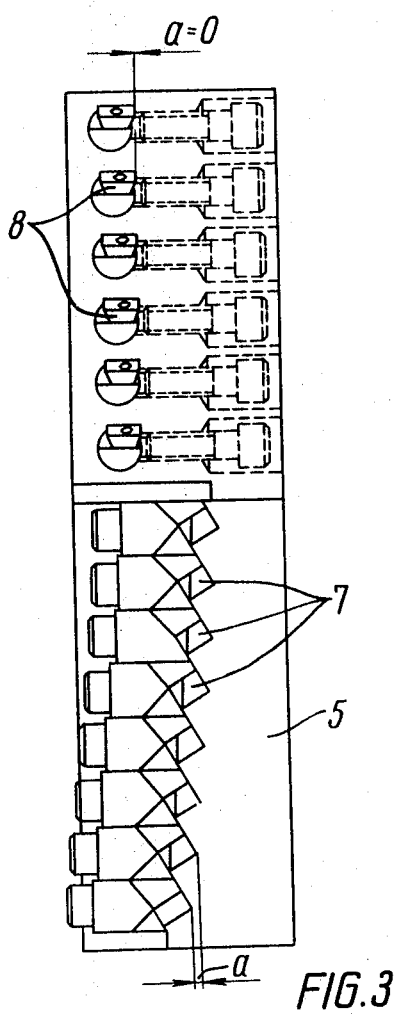
FIG. 3 is a development view shown along arrow A of FIG. 2.

Located in the holder 5 are turning cutters 7 which are essentially conventional-type hard-alloy plates, intended for machining cylindrical surface D of the workpiece 2. Apart from $\alpha$ angular displacement, the cutters 7 are displaced relative to each other along the axis $0_1–0_1$ of the spindle 1 by the value $a$ (FIG. 3) so that in combination they machine the entire width of the workpiece 2.

Cutters 8 intended for machining the face E are held in the holder 5 by a known method. The cutters 8 are held in the holder 5 with an $\alpha$ angular displacement and $\beta$ radial displacement (FIG. 2) in relation to each other. The radial displacement $b$ corresponds to the allowance for one cutter. All the cutters 8 jointly machine the entire face E. Each cutter 8 is essentially a conventional-type hard-alloy plate, mechanically clamped in a conventional holder.

Figure 4:
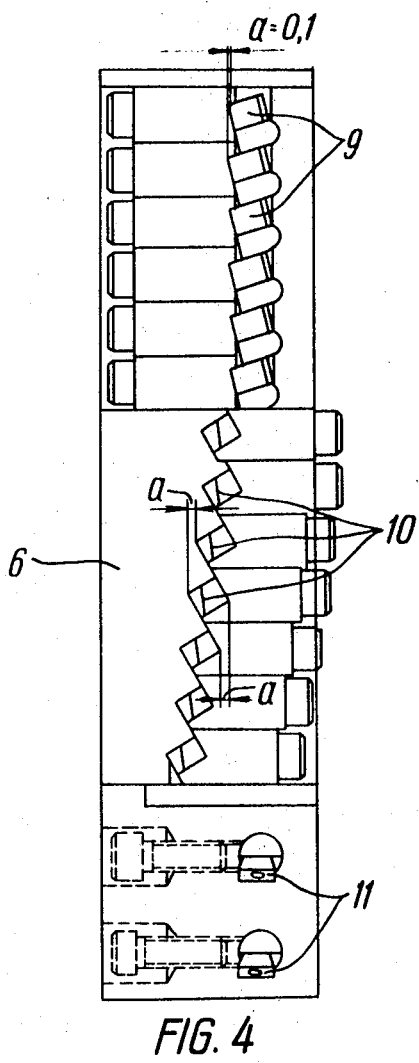
FIG. 4 is a development view, shown along arrow B of FIG. 2.

Disposed in the holder 6 with $\alpha$ angular displacement and $\beta$ radial displacement are face cutters 9 for machining face surface F. The construction and method of holding the cutters 9 is similar to those adopted for the cutters 7. Cutters 10 (FIG. 1) intended for machining cylindrical surface G are located in the same holder 6 with $\alpha$ angular displacement and $a$ axial displacement (FIG. 4) along the axis $0_1–0_1$ of the spindle 1. They are clamped in the holder 6 in the manner, similar to that adopted for the cutters 7 and 9.

Cutters 11 are intended for finishing face surfaces E and F. The group of cutters 9, 10 and 11 in the holder 6 (FIG. 2) is displaced relative to the group of cutters 7 and 8 in relation to the line of centers $0–0_1–0_2$ of the spindle and rest rotation through the angle $\beta$, which is less than the angle $\alpha$ of displacement of adjacent cutters in one and the same rest. Such a location of the cutters ensures successive machining of cylindrical and face surfaces from the two rests simultaneously.

Successive operation of the cutters ensures smooth spindle loading.

Figure 5:
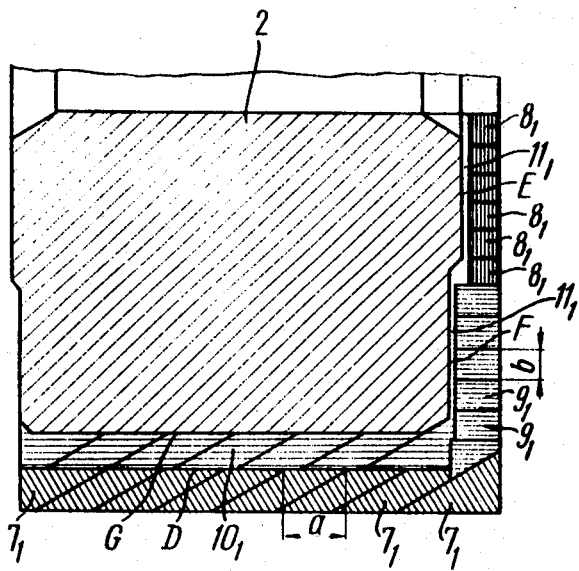
FIG. 5 shows on an enlarged scale a diagram of machining the workpiece by the cutters from two rests.

FIG. 5 shows a diagram of machining the workpiece 2 by the cutters from the two rests of the machine tool working member. The cutters 7 of the holder 5 (FIG. 2) successively remove corresponding allowance elements $7_1$ (FIG. 5) from the cylindrical surface D of the workpiece 2. After the first cutter from the group of turning cutters 7 removes the allowance elements $7_1$, the cutters 9 of the holder 6 start operating and successively remove respective allowance elements $9_1$ from the face F of the workpiece, after which the cutters 10 remove corresponding allowance elements $10_1$ from the cylindrical surface G of the workpiece. After them the cutters 8 and 11 of the holder 5 will remove corresponding allowance elements $8_1$ and $11_1$ from the faces E and F of the workpiece.

Axial, radial and angular displacements of the cutters in each holder allows the formation of the entire profile of the ready article during the rotary motion of the rests.

Technical possibilities of the machine tool are widened when using cutters which are movable relative to the rest and provide the possibility of machining various recesses, internal chamfers. One of these cutters 12 (FIG. 1) is held in one of the arms of a lever 13 with a pivot 14, installed on the rest 4. The other arm of the lever 13 is loaded by a spring 15, which turns the lever into the initial position, in which the cutter 12 is retracted from the workpiece 2. A pusher 16 acts upon the same arm of the lever 13 from a cam 17, installed on the stationary machine tool member.

The movable cutters can reciprocate in relation to the rest at various angles to the spindle axis. This movement can be effected by a cam, similar to the above-mentioned.

The turning is most effective when each rest and the spindle rotate in opposite directions. Moreover, the rotation of the rest and spindle in opposite directions simplifies the operative connection therebetween, as the employment of an idle gear is not required.

In this case each cam shaft 3 is operatively connected to the spindle 1 (FIG. 1) through a clearance-free gearing made, for example, as a two-worm gear. This gear comprises a worm wheel 18, fitted on the cam shaft 3, two worms 19 and 20, meshed with the worm wheel 18. The worms 19 and 20 of each gear are interconnected by means of a bevel pair 21. The driving worms 19 have a common drive through a bevel gear 22. Each of the driven worms 20 has a support 23, placed in a sleeve 24. The sleeve 24 is provided with an outer thread and is made integral with a screw gear 25. The clearances in each gear are eliminated by displacing the driven worm 20 in an axial direction along arrow H.

It is preferable that the worm gear 18 be located directly on the shaft 3, as this ensures high operative accuracy in the association between the spindle and rest.

The use of the clearance-free two-worm gear in the operative association between the spindle and the rest is instrumental for the most effective use of the turning process with the rotating rest. The fact that no clearances are present in the rest drive provides for smooth cutting of the cutters into the workpiece without impacts, the rests and the workpiece rotating in opposite directions. This, in turn, ensures favorable cutting angle transformation, the possibility to remove a thicker allowance layer to use small cutting forces and to reduce power consumption as well as to obtain high finish of the surface being machined.

The machine tool according to the present invention operates as follows.

The motion is transferred to the spindle 1 (FIG. 1) from the electric motor 26 through a V-belt drive 27 and an electromagnetic clutch 28. The workpiece 2 held on the spindle 1 by a known method is imparted rotation $n$, determining the cutting speed. The motion is transferred from the spindle 1 through toothed pairs 29, 30, 31 removable gears 32, an electromagnetic clutch 33, toothed pair 34, bevel gear 22 to the worms 19. The worms 19 rotate the worm wheels 18, fitted on the cam shafts 3 with the rests 4. The rests 4 are rotated with the speed of circular feed S. The workpiece 2 is simultaneously machined by the cutters of both rests at a certain turning angle $w$ of the rest (FIG. 2).

The cutters of the working member operate as follows. In accordance with a preset mechanical program of locating the cutters on the rests and in compliance with the diagram of the workpiece machining (FIG. 5), the cutters 7 located in the holder 5 with the $a$ axial displacement and $\alpha$ angular displacement, when the rest 4 is turned in the direction of the circular feed S, successively one after the other remove one allowance element after another from the cylindrical surface D of the workpiece. The cutters 9, held with $b$ radial displacement and $\alpha$ angular displacement in the second holder 6, placed on the other rest 4 of the working member, remove one allowance element after another from the face surface F. The cutters 7 and 9 operate successively in the following order: cutter 7, cutter 9, cutter 7, cutter 9, etc. After the cutters 9 have machined the face surface, the cutters 10 start operating, said cutters removing the allowance from the cylindrical surface G, operating in turn first with the cutters 7 and after the latter stop operating, with the cutters 8, clamped in the holder 5 of the first rest of the working member.

Finally the finishing cutters 11, clamped in the holder 6, finish the faces F and E.

Such an element by element removal of the allowance ensures the production of short chips which are easy to handle and remove from the zone of machining.

The cutter 12 (FIG. 1) fixed on the swivelling lever 13, when the rest 4 is rotated is transferred along a trajectory with a radius, equal to the distance from the axis 14 to the point of the cutter 12. When the pusher or follower 16 runs onto the stationary cam 17, the former is transferred from a projection on the cam 17 and presses an arm of the lever 13. The lever 13 turns in the direction of arrow I, and the cutter 12 enters an opening in the workpiece 2, thus machining the internal chamfer. When moving down the cam 17, the lever 13 under the action of the spring 15 turns into the initial position, and the cutter 12 is retracted from the workpiece. The machining of the workpiece chamfer is finished when the cutter 12 is on the line $0-0_1-0_2$ of the spindle and rest centers of rotation. The number of movable cutters is selected depending on the amount of the allowance to be removed.

The tangential cutting forces $P_z$ in the process of the working rotation of the rests are distributed with intervals equal to $\alpha$ angular displacement of adjacent cutters in the holder.

Figure 6:
FIG. 6 shows a cyclogram of tangential cutting force distribution from the cutters of one of the rests.

The cyclogram of cutting forces $P_z$ from the cutters, clamped in the holder 5 of the first rest (FIG. 6), corresponds to the operation of the cutters 7 and 8. The value of the cutting force $P_z$ is plotted on the Y-axis, while the angle $w$ of the rest turning is plotted on the X-axis. The cutting force $P_z$ of each cutter acts at the angle $\theta$ of contact between the cutter and workpiece (FIG. 2). As the force $P_z$ changes from zero to the maximum and again to zero, the force cyclogram has gaps in the intervals of the cutter operation. These gaps also depend on the $\alpha$ angle of displacement of the cutters and the $\theta$ angle of contact between the cutter and workpiece.

Figure 7:
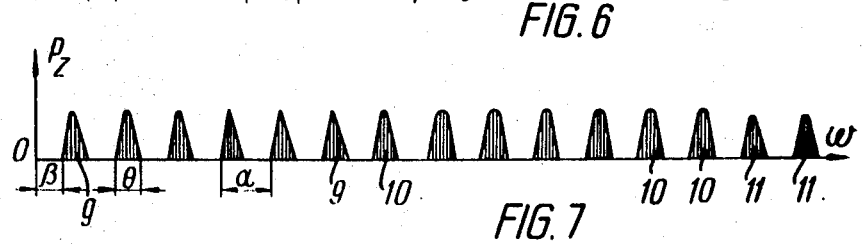
FIG. 7 shows a cyclogram of tangential cutting force distribution from the cutters of the other rest.

The cyclogram of the cutting forces $P_z$ from the cutters 9, 10 and 11 (FIG. 7), clamped in the holder 6 of the other rest, shows the same mode of distribution with the same intervals.

Figure 8:
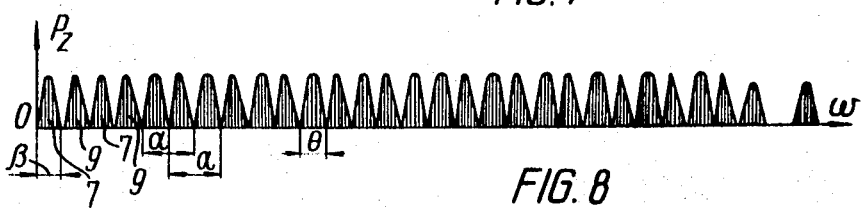
FIG. 8 shows cyclogram of distribution of summary tangential cutting forces from the cutters of the working member.

Owing to $\beta$ angular displacement of the group of cutters of the holder 5 relative to the group of cutters of the holder 6, said angle $\beta$ being less than angle $\alpha$ of displacement of the adjacent cutters in one holder, the summary action of the cutters of both rests of the working member upon the spindle is smoother (FIG. 8). The unevenness of the cutting forces is reduced. When angle $\alpha$ of displacement of the cutters is equal to angle $\theta$ of contact between the cutter and workpiece, the gaps can be fully eliminated.

When the spindle is evenly loaded the main drive capacity is rationally used, the system vibrations are reduced. Now it becomes possible to machine structural steels at considerable cutting rates: cutting speed V= 250–300 m./min. circular feed S=1–1.5 mm. per rev.

In some cases when it is necessary to compensate for the workpiece offsets under the action of the radial cutting force $P_y$ (FIG. 2), for example during finishing operations with small cutting forces $P_z$, the group of cutters of one rest is not displaced to the $\beta$ value in relation to the group of cutters of the other rest. Then the summary forces $P_z$ of the working member, having two rests become twice as much, which is permissible because of their small value, while the radial forces $P_y$ are mutually compensated without causing offsets of the spindle 1 with the workpiece 2.

On completion of the cutting process cams 35 and 36 (FIG. 1) fitted on the shafts 3, command to switch on a high-speed motor 37 and to switch off the electromagnetic clutches 33 and 28. When the clutch 28 is switched off, the spindle 1 is stopped. The clutch 33 breaks the chain of work feed of the rests 4 from the spindle 1.

From the high-speed electric motor 37 the motion is transmitted through the gears 38 and 34, bevel gearing 22, worms 19 and worm wheels 18 to the shafts 3. The rests 4 are imparted rapid rotation in order to quickly pass the inoperative section $W_1$ (FIG. 2). During the time of the rest passing this inoperative section $W_1$ the loading and unloading of the workpieces is performed. After the electric motor 37 is switched off the rests 4 are stopped in the initial position on the command of the cams 35.

The spindle speeds of rotation $n$ are changed by changing pulleys in the V-belt drive 27 or by switching-over gears in the gear box, not shown in FIG. 1. The circular feed S of the rests 4 is varied by means of removable gears 32.

The clearances in the operative chain, connecting the spindle 1 with the cam shafts 3 of the rests 4 are eliminated by the two-worm gear as follows.

When the shank 39 of the gear 40 is rotated, the gear 25 is rotated together with the cup 24; the latter, while screwing into the stationary member of the machine tool, pulls the worm 20 via the base 23 in an axial direction along arrow H (FIG. 1). The worm 20 is displaced until the worm wheel 18 comes in intimate contact with both worms 19 and 20.

Although the present invention is described with reference to the preferable embodiment of the present invention, it is clear that variations and changes may be made within the spirit and scope of the present invention, which is evident to those skilled in the art.

These variations and changes are considered within the essence and scope of the present invention and the appended claims.

What we claim is:

1. A multiple cutter lathe for machining a workpiece, said lathe comprising a casing, a spindle rotatably mounted within said casing, said spindle imparting rotary motion to said workpiece being machined, means for driving said spindle, cam shafts rotatably mounted in said casing and serving for controlling the machine tool cycle, and a working member, said working member comprising rests, said rests carrying cutters, each of said rests being operatively connected to a respective one of said cam shafts, each rest of the working member being fixed on its associated cam shaft for rotation therewith, said cutters being mounted with angular displacement relative to each other on said rests in rows such that a row of cutters of one rest is displaced relative to a row of cutters of the other rests in relation to the line of centers of rotation of said rests and said spindle by an angle smaller than the angular displacement of adjacent cutters such that the cutters of one rest are engageable with the workpiece being machined in turn with the cutters of the other rest.

2. A multiple cutter lathe as claimed in claim 1, wherein each rest of the working member is essentially a disc carrying holders for supporting said cutters therein relative to the spindle axis with displacement in the axial and radial directions.

3. A multiple cutter lathe as claimed in claim 1, wherein each rest is operatively connected to the spindle by its cam shaft, said spindle imparting rotation to the workpiece being machined through a clearance-free toothed gearing so that said cam shaft with the rest and said spindle with the workpiece rotate in opposite directions.

References Cited

UNITED STATES PATENTS

| | | | |
|---|---|---|---|
| 893,239 | 7/1908 | Gridley | 82—18 |
| 1,130,276 | 3/1915 | Hartness | 82—25 |
| 1,346,259 | 7/1920 | Schlieder | 82—25 X |
| 1,531,565 | 3/1925 | Melling | 82—18 |
| 2,561,035 | 7/1951 | Robichaud | 82—19 X |
| 2,696,883 | 12/1954 | Broden | 82—48 |
| 3,308,695 | 3/1967 | Hagerman | 82—11 X |

ANDREW R. JUHASZ, Primary Examiner

L. GILDEN, Assistant Examiner

U.S. Cl. X.R.

82—11, 19